(12) United States Patent
Nelson et al.

(10) Patent No.: US 7,341,086 B2
(45) Date of Patent: Mar. 11, 2008

(54) AUTOMATED FABRIC LAYUP SYSTEM AND METHOD

(75) Inventors: W. Robert Nelson, Wichita, KS (US); Michael C. Dowling, Derby, KS (US); Mark K. Stephen, Wichita, KS (US); Raymond L. Royal, Sedgwick, KS (US); C. Tim Harbaugh, Derby, KS (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 10/975,433

(22) Filed: Oct. 29, 2004

(65) Prior Publication Data

US 2006/0090856 A1    May 4, 2006

(51) Int. Cl.
*B32B 27/06* (2006.01)
(52) U.S. Cl. .................. 156/523; 156/577; 156/527
(58) Field of Classification Search ............. 156/523, 156/577, 527; 83/343; 100/90; 199/39
See application file for complete search history.

(56) References Cited

U.S. PATENT DOCUMENTS

| 3,410,162 | A | * | 11/1968 | Ruggeri ................... 83/100 |
| 4,867,834 | A | | 9/1989 | Alenskis et al. |
| 5,176,785 | A | | 1/1993 | Poyet et al. |
| 5,352,306 | A | | 10/1994 | Grimshaw et al. |
| 5,989,384 | A | * | 11/1999 | Grimshaw et al. ......... 156/312 |
| 6,390,169 | B1 | | 5/2002 | Johnson |

* cited by examiner

*Primary Examiner*—Laura Edwards
(74) *Attorney, Agent, or Firm*—Baker & Hostetler LLP

(57) ABSTRACT

To apply a resin impregnated fabric to a substrate, a device includes a surface having a layer of material and a first edge. The surface moves relative to the substrate and to conform to the substrate. The layer of material is compatible for use with the resin. The first edge is disposed at the front of the surface relative to the movement of the device to the fabric. The first edge is curved with a center portion of the first edge being relatively forward of a pair of side portions of the first edge.

7 Claims, 8 Drawing Sheets

AUTOMATED FABRIC LAYUP SYSTEM AND METHOD

FIELD OF THE INVENTION

The present invention generally relates to a device, system and method of fabricating a composite item. More particularly, the present invention pertains to an automated fabric layup device and system and a method of use.

BACKGROUND OF THE INVENTION

Composite structures are typically constructed from multiple layers or plies. The plies, in turn, are generally made up of a series of courses that slightly overlap or abut one another. These courses may include a variety of materials such as glass, aramid, and carbon fiber, various other fibers, and the like. In addition, the fibers may be oriented in a single direction or woven into a fabric. The course material may further be pre-impregnated with a resin and are often dispensed from a roll. In roll form, the course material typically includes a separator film or backing film of plastic, paper, or the like. This backing film generally prevents resin coated or pre-impregnated course material (prepreg) from adhering to itself.

The courses are generally laid upon the form or tool along a "natural path" of the course material. The term "natural path" refers to the path the course material would follow when rolled out on to the surface of the tool. Deviations from the natural path are generally achieved by applying force across the width of the course material. When the force applied exceeds the flexing capacity of the material, wrinkles or bridges form in the course material. In addition, the wider the course is, the more prone the course material is to wrinkle. However, in general, it is advantageous to utilize relatively wide course material so as to increase layup rates. Conventional methods of constructing contoured composite structures from fabric course material employ skilled technicians to hand lay the fabric. These technicians pull on the edges and corners of the fabric to deform or trellis the weave of the fabric. In this manner, the fabric is induced to conform to the contour.

When laying a course adjacent to a previously applied course the natural path of the course across a contour may cause the courses to diverge or converge. In order to prevent gaps or excessive overlap, the side edge or profile of the course is trimmed to maintain an appropriate relationship. Conventional methods of trimming or profiling also generally employ skilled technicians to perform these tasks. As a result, hand layups of contoured surfaces with fabric course material is expensive and time consuming.

Accordingly, it is desirable to provide a system for generating composite items that is capable of overcoming the disadvantages described herein at least to some extent.

SUMMARY OF THE INVENTION

The foregoing needs are met, to a great extent, by the present invention, wherein in some embodiments an automated lamination system for generating composite items from fabric ply material and a method of using such a system is provided.

An embodiment of the present invention relates to a device to apply a resin impregnated fabric to a substrate. The device includes a surface having a layer of material and a first edge. The surface moves relative to the substrate and to conform to the substrate. The layer of material is compatible for use with the resin. The first edge is disposed at the front of the surface relative to the movement of the device to the fabric. The first edge is curved with a center portion of the first edge being relatively forward of a pair of side portions of the first edge.

Another embodiment of the present invention pertains to a device to apply a resin impregnated fabric to a substrate. The device includes a supply reel, a cutting system, and a pressure shoe. The supply reel supplies the resin impregnated fabric. The cutting system cuts resin impregnated fabric. The pressure shoe presses the resin impregnated fabric on to the substrate. The pressure shoe includes a surface having a layer and a first edge. The surface moves relative to the substrate and to conform to the substrate. The layer of material is compatible for use with the resin. The first edge is disposed at the front of the surface relative to the movement of the pressure shoe to the fabric. The first edge is curved with a center portion of the first edge being relatively forward of a pair of side portions of the first edge.

Yet another embodiment of the present invention relates to a system for fabricating a composite item from a resin impregnated fabric placed on a layup form. The system includes a fabric lamination machine that includes an end effector. The fabric lamination machine moves the end effector along a natural path across the layup form. The end effector includes a supply reel and a pressure shoe. The supply reel retains a supply of the resin impregnated fabric. The resin impregnated fabric is withdrawn from the supply reel at a feed rate. The pressure shoe presses the resin impregnated fabric on to the layup form. The pressure shoe includes a surface having a layer of material and a first edge. The surface moves relative to the layup form and conforms to the layup form. The layer of material is compatible for use with the resin. The first edge is disposed at the front of the surface relative to the movement of the pressure shoe to the resin impregnated fabric. The first edge is curved with a center portion of the first edge being relatively forward of a pair of side portions of the first edge.

Yet another embodiment of the present invention pertains to an apparatus for fabricating a composite item from a material placed on a layup form. The apparatus includes a means for determining a first location on the layup form to place the material, a means for determining a second location on the layup form to stop placing the material, and a means for cutting the material to generate a first edge that substantially conforms to the layup form at the first location in response to the first edge being different from the layup form at the first location. In addition, the apparatus includes a means for tacking the first edge to the layup form at the first location and a means for applying the material along a natural path of the layup form between the first location and the second location. The material is urged outward from about a longitudinal centerline of the material by movement of a curved surface relative to the material. The apparatus further includes a means for cutting the material to generate a second edge that substantially conforms to the layup form at the second location in response to approaching the second location.

Yet another embodiment of the present invention relates to a method of fabricating a composite item from a material placed on a layup form. In this method, a first location is determined on the layup form to place the material, a second location is determined on the layup form to stop placing the material, and the material is cut to generate a first edge that substantially conforms to the layup form at the first location in response to the first edge being different from the layup form at the first location. In addition, the first edge is tacked to the layup form at the first location, the material is applied along a natural path of the layup form between the first location and the second location. The material is urged outward from about a longitudinal centerline of the material by movement of a curved surface relative to the material and the material is cut to generate a second edge that substantially conforms to the layup form at the second location in response to approaching the second location.

Yet another embodiment of the present invention pertains to a computer readable medium on which is embedded computer software comprising a set of instructions for executing a method of fabricating a composite item from a material placed on a layup form. In this method, a first location is determined on the layup form to place the material, a second location is determined on the layup form to stop placing the material, and the material is cut to generate a first edge that substantially conforms to the layup form at the first location in response to the first edge being different from the layup form at the first location. In addition, the first edge is tacked to the layup form at the first location, the material is applied along a natural path of the layup form between the first location and the second location. The material is urged outward from about a longitudinal centerline of the material by movement of a curved surface relative to the material and the material is cut to generate a second edge that substantially conforms to the layup form at the second location in response to approaching the second location.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a system for placing plies to generate a composite item and a method of using this system. In an embodiment, the invention provides for a numerically controlled (NC) automated fabric lamination machine (AFLM). This lamination device includes a positioning device to position an end effector. The positioning device includes any suitable device such as a gantry, robotic armature, wheeled or tracked vehicle, and/or the like. The end effector generally includes any device suitable to be positioned by the positioning device. For example, end effectors include milling, dispensing, and/or finishing heads or modules. In a particular example, the end effector includes a dispensing head to place plies, or resin impregnated fabric, upon a layup mold or tool. Typically, the ply material is slightly tacky and will adhere to the surface of the tool, or previously applied plies, in response to a sufficient amount of compressive force. To apply this force, the end effector includes a pressure shoe module. In addition, the end effector includes a cutting assembly having a rotating anvil to support cuts in the ply material.

Figure 1:
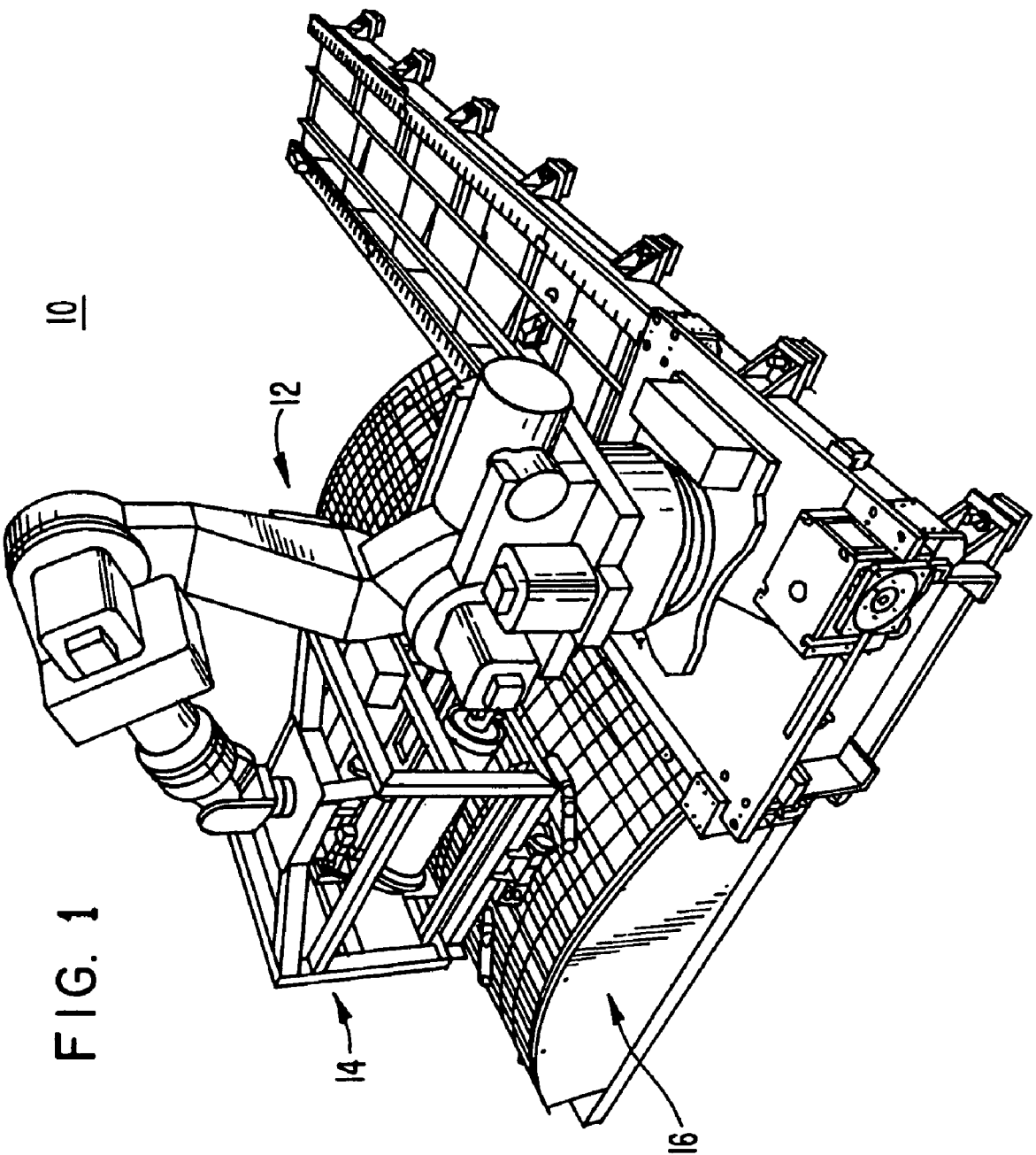
FIG. 1 is a perspective view of an automated fabric lamination machine according to an embodiment of the invention.

The invention will now be described with reference to the drawing figures, in which like reference numerals refer to like parts throughout. FIG. 1 is a perspective view of an automated fabric lamination machine (AFLM) 10 suitable for use with an embodiment of the invention. As shown in FIG. 1, the AFLM 10 includes a positioning device 12 to control the movement of an end effector 14 relative to a layup mold or tool 16. In various forms, the positioning device 12 includes any suitable system to control the movement of the end effector 14 relative to the tool 16. Examples of suitable systems include an armature type device as illustrated in FIG. 1, a gantry type device, and the like. In an embodiment of the invention, the positioning device 12 is configured to control twelve axes of movement (seven axes of the positioning device and five axes of the end effector 14). However, it is to be understood that the specific number of axes may depend upon the particular operating condition and thus, the number of axes controlled is not critical to the invention.

Figure 2:
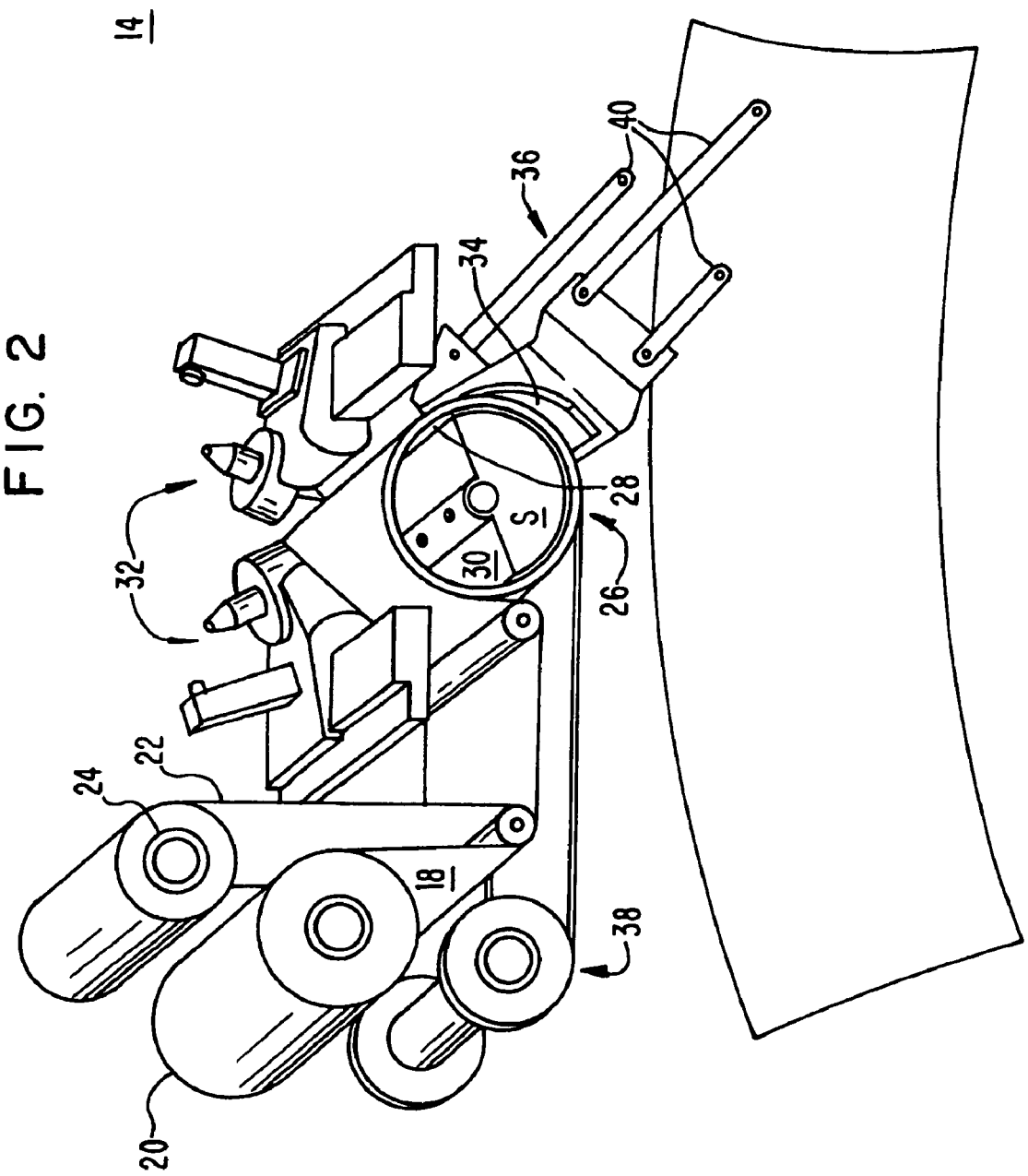
FIG. 2 is a simplified view of an end effector suitable for use with the embodiment of the invention illustrated in FIG. 1.
Figure 3:
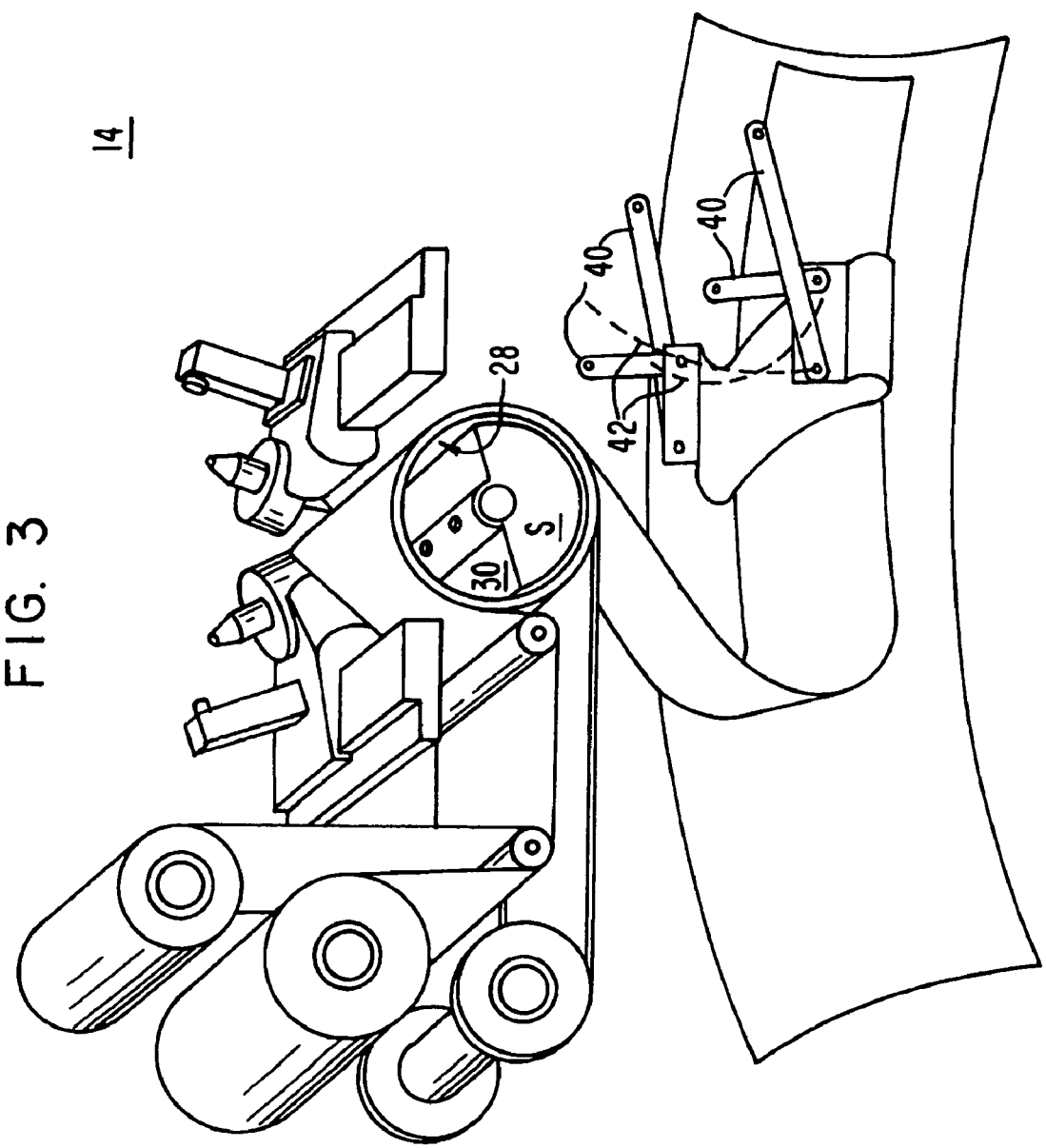
FIG. 3 is a simplified view of the end effector suitable for use with the embodiment of the invention illustrated in FIG. 1.

FIGS. 2 and 3 are perspective views of the end effector 14. As shown in FIG. 2, a pre-impregnated fabric material ("prepreg") 18 is stored on a supply roll 20. As the prepreg 18 is dispensed from the supply roll 20, a separator or backing film 22 is stripped away and accumulates on a backing take-up roll 24. The prepreg 18 is conveyed to and wrapped partially around a vacuum cutting drum 26 or anvil. This cutting drum 26 includes a porous tube 28 of a material suitable for use as a knife cutting back-up surface. Examples of suitable materials include ultra high molecular weight ("UHMW") polyethylene, Delrin®, nylon, acetal, and the like. A vacuum chamber 30 is disposed within the drum 26 and configured to draw air through the porous tube 28. In this manner, the prepreg 18 is drawn toward the cutting drum 26 and essentially held in place along the outside of the tube 28. In an embodiment, air is drawn through the cutting drum 26 at those locations covered by the prepreg 18 and is essentially sealed at those locations not covered by the prepreg 18. In this manner, vacuum pressure is not wasted. In a specific example, the vacuum chamber 30 includes a seal S that directs the vacuum towards about half of the circumference of the cutting drum 26.

The end effector 14 further includes one or more cutting assemblies 32 to cut the prepreg 18. For example, the end effector 14 includes a pair of cutting assemblies 32 configured to cut the prepreg 18 held on the drum 26. In general, the cutting assemblies 32 perform end cuts, such as leading edge and trailing edge cuts and/or perform cuts to generate side edge profiles. The cutting assemblies 32 include any suitable device operable to sever or otherwise cut the prepreg 18. Suitable devices include ultrasonic knives, saws, lasers, and the like. Furthermore, the cutting assemblies 32 are configured to perform according to signals from a controlling device. In this regard, to generate edge profiles and diagonal cuts in the prepreg 18, movement of the cutting drum 26 is controlled to coincide with movement of the cutting assemblies 32. According to an embodiment, movement of the cutting drum 26 is utilized to orchestrate movements of the various other components of the AFLM 10. For example, in response to the cutting drum 26 being controlled to advance the prepreg 18 through the end effector 14, the supply roll 20 is controlled to dispense prepreg 18 and the positioning device 12 is controlled to advance the end effector 14 along the tool 16.

According to an embodiment and as illustrated in FIGS. 2 and 3, the cutting assemblies 32 are offset with regard to their respective positions along the cutting drum 26. In this manner, each of the cutting assemblies 32 are configured to cut across the full width of the prepreg 18 or any portion thereof without interfering with the action of the one or more other cutting assembly 32. It is an advantage of the offset in the cutting assemblies 32 that while one cutting assembly 32 is cutting a profile of the prepreg 18, another cutting assembly 32 may perform an end cut.

The end effector 14 further includes a pressure shoe 34 and pressure shoe module 36. At the beginning of each laydown run, the pressure shoe module 36 is configured to transfer the prepreg 18 from the drum 26 and apply the material on to the tool 16. For example, in response to a leading edge of the prepreg 18 reaching an appropriate position along the drum 26, the prepreg 18 is detachably secured to the pressure shoe 34. As shown in FIG. 3, the pressure shoe module 36 is configured to control the movement of the pressure shoe 34 from a 'transfer' position shown in FIG. 2 to a 'laydown' position shown in FIG. 3. As the pressure shoe 34 is moved in this manner, additional prepreg 18 is fed and processed through the end effector 14 to provide sufficient slack and form a "loop" of the prepreg 18 ahead of the pressure shoe 34.

In addition, excess prepreg 18 beyond the edge profile cut by the cutting assemblies 32 is accumulated on a take-up roll 38. In an embodiment, some portion of each side edge of the prepreg 18 is left uncut. In this manner, a continuous strip of prepreg 18 is generated that facilitates collection of the prepreg 18.

In an embodiment, the pressure shoe module 36 includes a plurality of linkages 40. These linkages 40 are configured to facilitate movement of the pressure shoe 34 along the paths 42 indicated by the dashed lines shown in FIG. 3. In conjunction with the movement of the pressure shoe module 36, various other components of the AFLM 10 are synchronized during transfer. That is the prepreg 18 being dispensed by the vacuum cutting drum 26 and the edges profiled by the cutting assemblies 32 are controlled in such a manner so as to maintain the positional integrity of the prepreg 18 relative to the pressure shoe 34. In other words, sufficient prepreg 18 is dispensed during the transfer that tension does not build up and cause the prepreg 18 to slide on the pressure shoe 34. In this manner, the cut edges may be accurately placed upon the tool 16. It is an advantage of this embodiment that the pressure shoe 34 initially moves away from the drum 26 in an essentially tangent manner. That is, relatively little torque is initially applied to the prepreg 18. Once sufficient slack has accumulated between the vacuum cutting drum 26 and the pressure shoe 34, the pressure shoe module 36 is controlled to orient the pressure shoe 34 and attached prepreg 18 into the laydown position as illustrated in FIG. 3. According to other embodiments, the pressure shoe module 36 is controlled to move in a similar manner utilizing other suitable devices. For example, the pressure shoe module 36 is configured to follow a race or other such channel that conforms to the path 42. In another example, a numerically controlled armature is configured to control the pressure shoe module 36 along the path 42.

Figure 4:
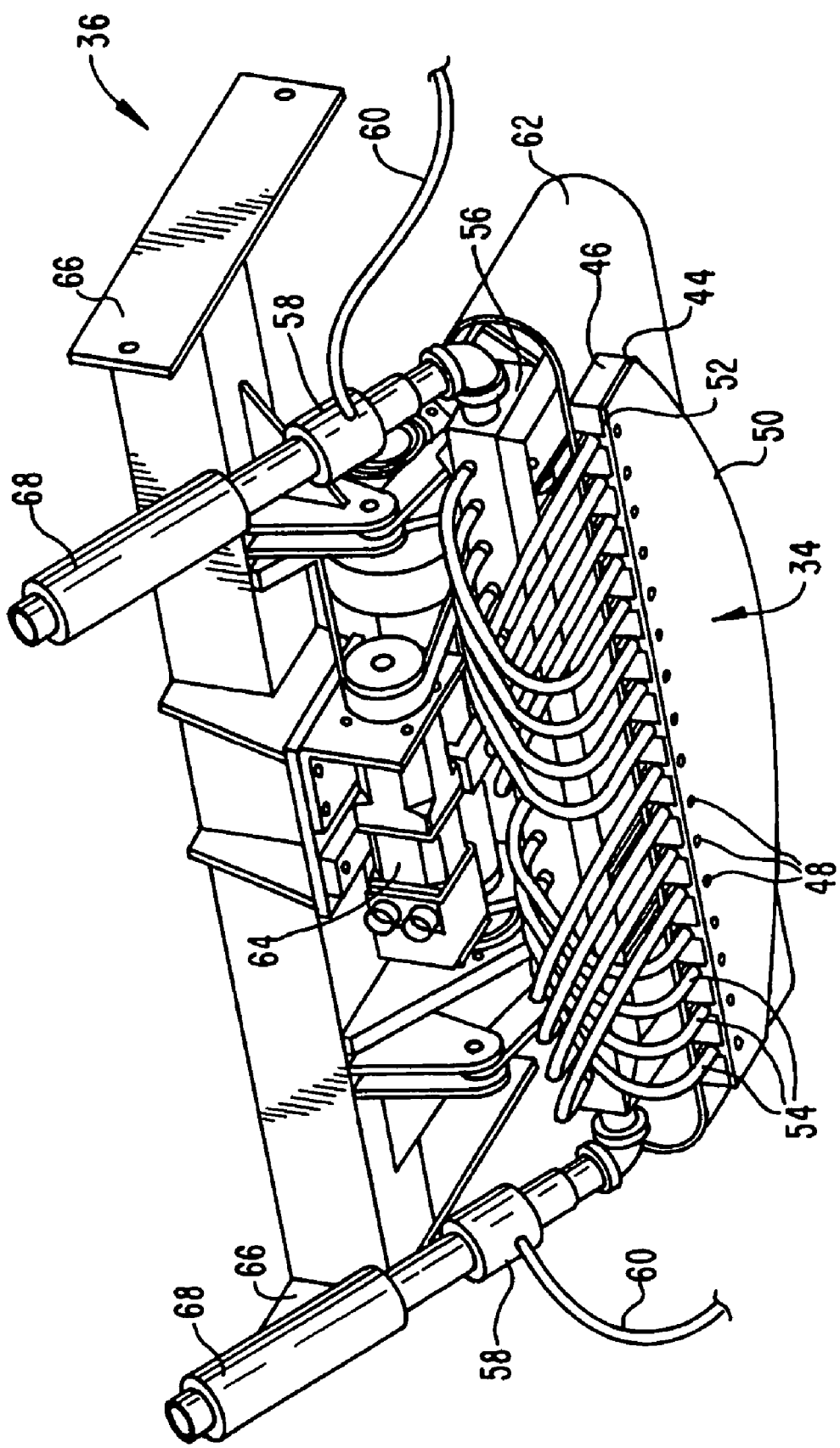
FIG. 4 is a perspective view of a pressure shoe module according to the embodiment of the invention illustrated in FIG. 1.

FIG. 4 is a perspective view of the pressure shoe 34 and pressure shoe module 36 according to an embodiment shown in FIG. 1. As shown in FIG. 4, the pressure shoe 34 includes a contact surface 44, conforming material 46, and vacuum ports 48. The contact surface 44 includes a flexible material suitable for use with the resin impregnated prepreg 18. Examples of suitable materials include polyethylene polymers, UHMW polyethylene, Delrin®, nylon, acetal, and the like. In addition, the contact surface 44 includes a curved forward edge 50. It is an advantage of embodiments of the invention that the curved forward edge 50 facilitates an outward spreading of the prepreg 18 as the prepreg 18 is being applied to the tool 16. This outward spreading reduces a tendency of the prepreg 18 to "wrinkle" when applied to a curved tool 16. To explain, when a fabric is draped over a double convex male surface such as a dome, excess fabric accumulates along the edge. If this excess fabric is not dealt with, wrinkles will result. By pulling or stretching the fabric along the edges or at the corners of the fabric and in line with the direction the fabric is being placed, the excess fabric is displaced. This "stretching" causes the angle between longitudinal and crosswise (warp and fill) yarns to deviate from 90 degrees in some areas, but the length of each individual yarn remains essentially constant. This change in angle between warp and fill fibers is called "trellising."

The conforming material 46 includes a foam or other such compressible and resilient material that provides support for the contact surface 44 and facilitates conformation of the contact surface 44 to a contour of the tool 16. More particularly, the conforming material 46 facilitates conformation to positive and negative radius contours that are in line with the contact surface 44, perpendicular to the contact surface 44, and/or at an oblique angle to the contact surface 44. The amount of curvature the conforming material 46 is able to accommodate is dependent upon a variety of factors, such as, for example: length, width, thickness, compressibility, and resilience of the conforming material 46.

In an embodiment, the vacuum ports 48 are disposed in close proximity to a trailing edge 52 of the contact surface 44. The vacuum ports 48 are in fluid connection to a vacuum source such as, for example a vacuum pump, vacuum producing venturi, and/or the like. For example, as illustrated in FIG. 4, each vacuum port 48 is connected to a respective vacuum hose 54, which in turn, is connected to a vacuum manifold 56. The vacuum manifold 56 is in fluid connection to a vacuum producing venturi 58 that is powered via a pressure hose 60 that supplies compressed air. To decrease the radius of curvature of the vacuum hoses 54 and thereby decrease the tendency of the vacuum hoses 54 to "kink", the vacuum hoses 54 are routed to vacuum ports 48 as illustrated in FIG. 4. It is an advantage of such a routing scheme that by routing the vacuum hoses 54 that supply vacuum to the more centrally located vacuum ports 48 to the vacuum manifold relatively closer (proximal) to the vacuum source than the relatively distal vacuum ports 48 the vacuum force of the vacuum ports 48 that are relatively centered upon the contact surface 44 are increased.

In various other embodiments, the vacuum ports 48 are disposed about the middle and/or curved forward edge 50 of the contact surface 44. In addition, although the vacuum ports 48 are illustrated in FIG. 4 as being substantially uniform in size and spaced substantially evenly along the trailing edge 52, in other embodiments, the spacing and/or port diameter is heterogeneous. For example, to increase vacuum holding potential near the center of the contact surface 44, the vacuum ports 48 are disposed more densely towards the center of the contact surface 44. Furthermore, the vacuum ports 48 need not be holes, but rather, include porous or permeable material.

In addition to the vacuum manifold 56 and vacuum producing venturi 58, the pressure shoe module 36 includes a spring 62, actuator 64, and attachment flanges 66. The spring 62, or platen, supports the contact surface 44 and is configured to conform to a contour in the tool 16. In this regard, the conforming material 46 facilitates conformation to relatively small contours in the tool while the spring 62 facilitates conformation to relatively large contours in the tool. To facilitate these relatively large contours, the spring 62 includes a sheet of resilient material such as metals, plastics, composites, and/or the like. In a particular example, the spring 62 includes a sheet of fiberglass that, as shown in FIG. 4, is supported at both ends and configured to flex. To generate a substantially uniform amount of downward pressure across the length of the spring 62, the cross-section of the spring 62 is varied across the length. The amount of curvature the spring 62 is able to accommodate is dependent upon a variety of factors, such as, for example: length, width, thickness, and resilience of the spring 62. For example, in an embodiment, the spring 62 is configured to facilitate conformation to contours having a positive radius of about 20 inches or greater.

The actuator 64 applies torque to the linkages 40 in response to controlling signals. In this manner, the pressure shoe module 36 is moved between the transfer and laydown positions. The attachment flanges 66 provide fastening points to attach the pressure shoe module 36 to the end effector 14. In addition, the pressure shoe module 36 optionally includes a respective exhaust muffler 68 for each of the vacuum producing venturis 58 to lessen noise produced therein.

Figure 5:
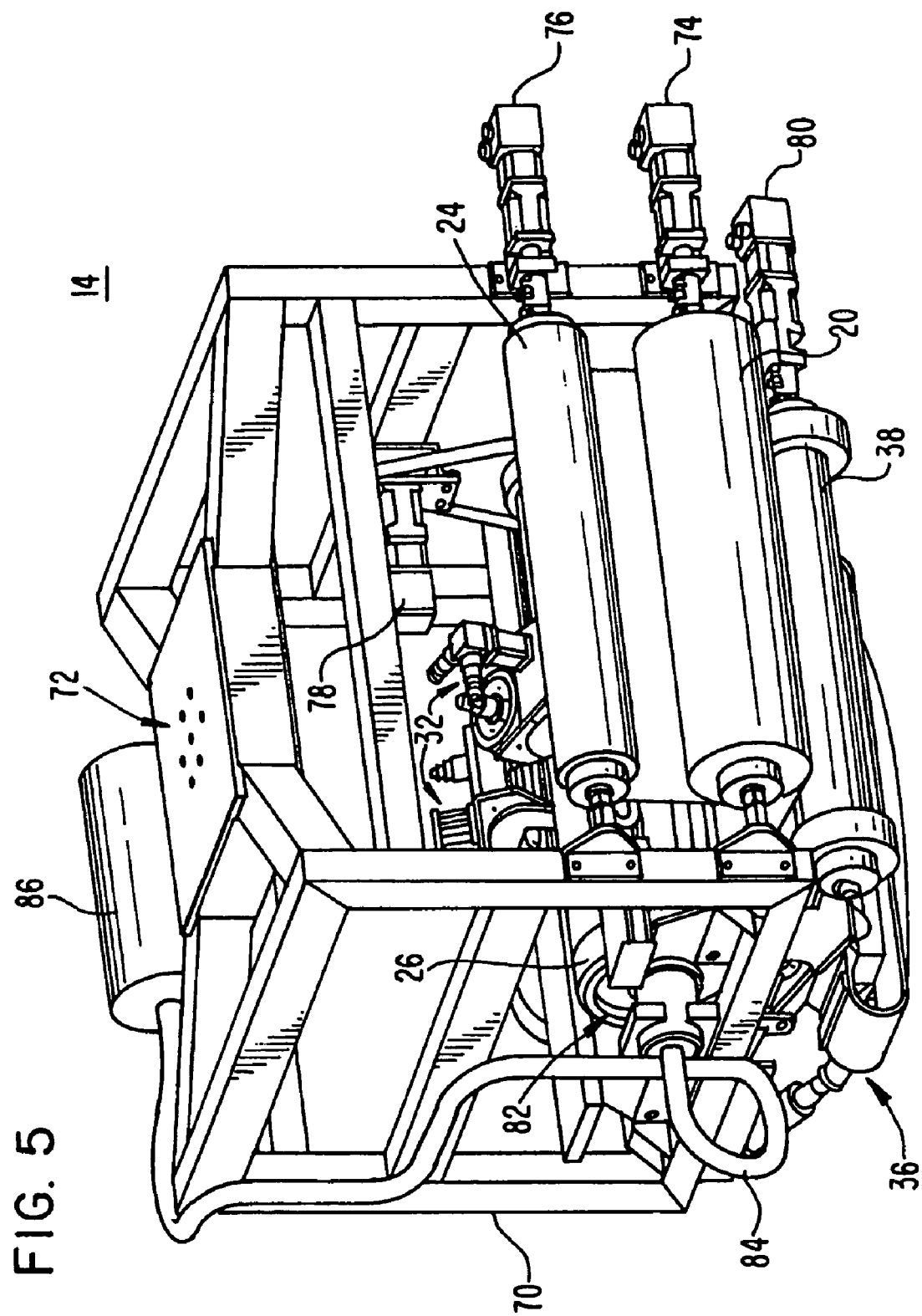
FIG. 5 is a perspective view of the end effector suitable for use with the embodiment of the invention illustrated in FIG. 3.

FIG. 5 is a perspective view of the end effector 14 according to an embodiment shown in FIG. 1. As shown in FIG. 5, end effector 14 includes a housing or frame 70 to attach and support the various components of the end effector 14. The frame 70 includes a mounting plate 72 to secure the end effector 14 to the positioning device 12. Additionally shown in FIG. 5 is a plurality of actuators 74-80 configured to respectively control the rotational movement of the supply roll 20, backing take-up roll 24, vacuum cutting drum 26, and take-up roll 38. Further illustrated in FIG. 5 is a hub 82, vacuum hose 84, and vacuum producing device 86 such as a vacuum pump, turbine, and/or venturi/muffler.

Figure 6:
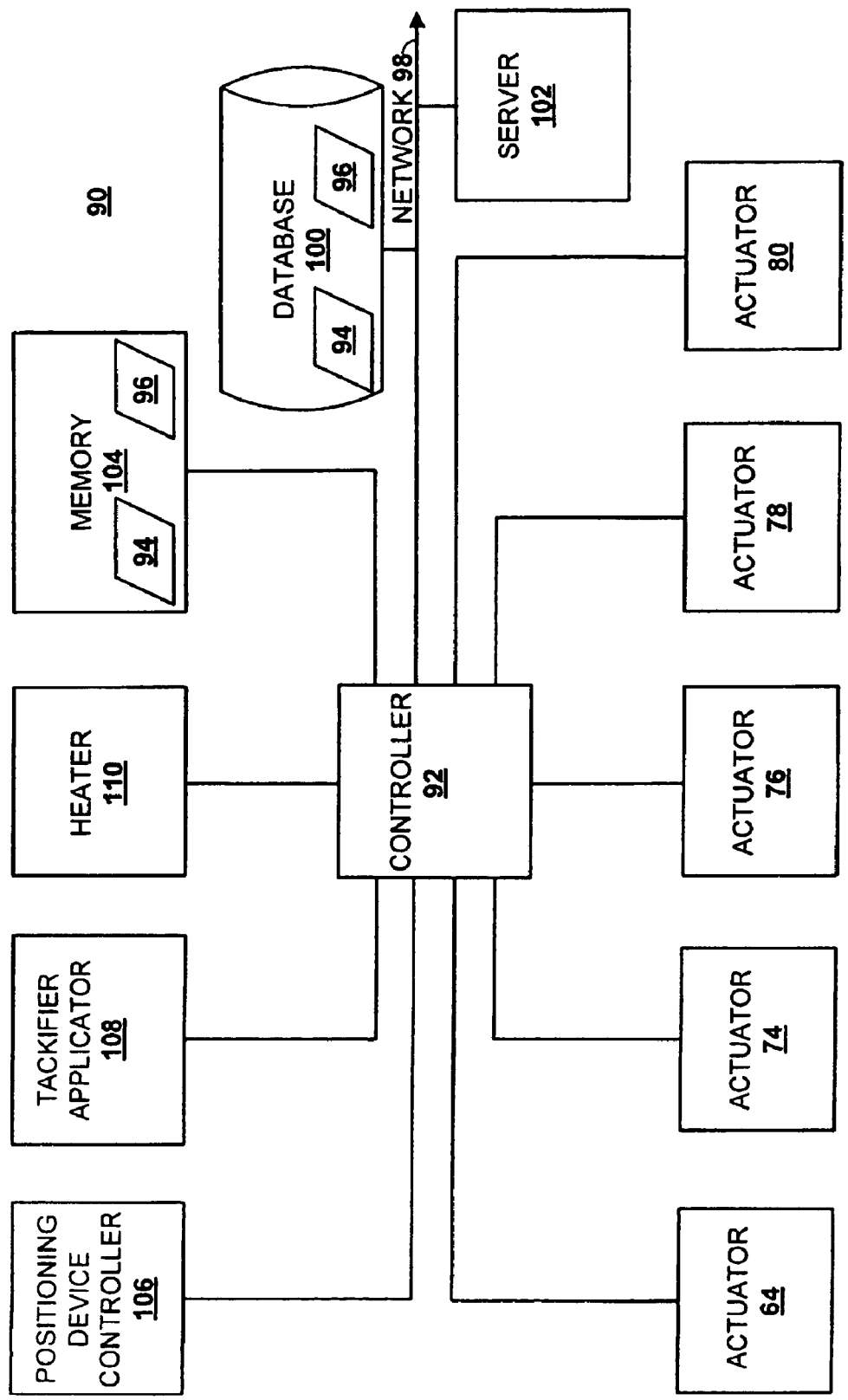
FIG. 6 is a block diagram of a system for laminating a composite item according to an embodiment of the invention.

FIG. 6 is a block diagram of a system 90 suitable for use with the AFLM 10. As shown in FIG. 6, the system 90 includes a controller 92. The controller 92 is operable to execute computer readable code. In this regard, the system 90 includes a set of computer readable instructions or code 94. According to the code 94, the controller 92 is configured to access a file 96. This file 96 includes one or more of the following: a computer readable model of the composite item; a computer readable representation of the surface of the layup form or the tool 16; a computer readable representation of the edges of the tool 16; the thickness of the composite item; a source code based upon at least one of the composite item and the tool 16; a set of movement instructions based upon the source code; data gathered while laying up the composite item; timestamp information; positional information; identification numbers; and the like. The controller 92 is further configured to communicate across a network 98. The network 98 is optionally included to provide additional data storage and/or processing capabilities. In this regard, the network includes a database 100 and a server 102. The database 100 is configured to store a copy of the code 94 and/or file 96. The server 102 is configured to generate, store, and perform any suitable processing of the code 94 and/or file 96. In this manner, composite items generated on computer aided design (CAD) machines such as the server 102, for example, may be forwarded to the AFLM 10. In addition, the server 102 is operable, via the network 98, to forward updates for the code 94 and/or file 94. In addition, the system 90 optionally includes a memory 104. If present, the memory 104 is configured to store a copy of the code 94 and/or file 96.

Also shown in FIG. 6 is a positioning device controller 106. The positioning device controller 106 is optionally included in the system 90 depending upon the requirements of the various actuators and/or servo motors of the AFLM 10. That is, depending upon the particular configuration of the AFLM 10, a plurality of actuators and/or servo motors modulate the rotation, position, speed, direction, and the like of the various components of the AFLM 10. More particularly, these actuators and/or servo motors of the positioning device are at least configured to modulate the various axes of the end effector 14 and/or AFLM 10. If present, parameters of the positioning device controller 106 are based upon the specification of the various actuators, servos, and/or the controller 92. The positioning device controller 106, if present, is configured to control some or all of these actuators and/or servo motors. In addition, these actuators and/or servo motors are optionally operable to be modulated by the controller 92 directly, and thus, the system 90 may not include the positioning device controller 106.

In addition, the controller 92 is configured to modulate any suitable actuator and/or servo motor, such as the actuators 64 and 74-80 and the cutting assemblies 32 for example, and thereby control the various components of the AFLM 10. In this manner, the controller 92 is configured to control the movement of the prepreg 18 through the end effector 14. In this regard, the actuators 74-80 are configured to modulate the position, speed, direction, tension, and the like of the prepreg 18 and the separator film. Furthermore, the controller 92 is configured to modulate the actuator 64 and thereby control the pressure shoe module 36.

The system 90 further includes a plurality of sensors configured to sense the various operating conditions of the AFLM 10. More particularly, the system 90 optionally includes sensors to sense any suitable attribute of the AFLM 10. Examples of suitable attributes include some or all of the temperature of the prepreg 18, the temperature at the location where the separator film 22 is separated from the prepreg 18 (release point), feed rate and direction, material placement, backing integrity, supply of prepreg 18, prepreg 18 tension between the supply roll 20 and the vacuum cutting drum 26, prepreg 18 tension between the vacuum cutting drum 26 and take-up roll 38, and/or the like.

To apply a tackifier to the tool 16, the system 90 optionally includes a tackifier applicator 108. The tackifier facilitates first ply adhesion to the tool 16. More particularly, tackifier resins modify the Theological properties of an adhesive system. These tackifiers are combined with base polymers/elastomers in adhesives to improve the tack or ability to stick. In general this property is achieved by an increased wetting out onto a surface and improved specific adhesion. More specifically, by modulating the tackifier and base resin combination, the viscoelastic behavior of the adhesive is varied. In addition, the particular tackifier utilized is typically dependent upon its suitability or compatibility with the base resin. For example, suitable tackifiers for use with a bismaleimide (BMI) resin base may include: Toray E-09 manufactured by Toray Composites (America) of Tacoma, Wash.; MSR 355-HSC manufactured by The Boeing Company of Chicago, Ill.; and the like. The invention is not limited to the use of BMI resin and its compatible tackifiers, but rather, any suitable resin and base/tackifier resin system is within the scope of embodiments of the invention. However, tackifier may tend to foul the contact surface 44. As the width of the prepreg 18 is modulated by the cutting assemblies 32, so to is the width of the tackifier application modulated. In this regard, the tackifier applicator 108 applies the tackifier in a controllable manner. In an embodiment, the tackifier applicator 108 is modulated by the controller 92 to apply the tackifier to the tool 16 in an area where the prepreg 18 is to be placed substantially without overlap into adjacent areas. For example, the tackifier applicator 108 includes an array of independently controllable spray nozzles that essentially span the width of the prepreg 18. In another example, the tackifier applicator 108 includes a spray nozzle that is controllable to sweep to and fro and thereby span the width of the prepreg 18 or some portion thereof.

To evaporate the tackifier ("flash off"), modulate the temperature of the tool 16, the prepreg 18 and/or the separator film 22, the system 90 optionally includes a heater 110. The heater 110 includes any suitable heating device such as, for example an electrical heating element and blower, infrared device, induction heater, and/or the like. In a particular example, the heater 110 includes a heating element and a blower configured to direct a stream of heated air as appropriate. For example, the stream of heated air may be directed aft of the tackifier applicator 108 and forward of the pressure shoe module 36. In addition, the heater 110 optionally includes a nib heater, chute heater, and release point blower. If present, these devices are modulated by the controller 92. The nib heater applies a controlled amount of heat to the tool 16, the prepreg 18 and/or the separator film 22 in response to controlling signals generated by the controller 92. Similarly, the chute heater applies a controlled amount of heat to the prepreg 18 and/or the separator film 22 in response to controlling signals generated by the controller 92. In addition, the release point blower directs a flow of air toward the release point in response to controlling signals generated by the controller 92.

Figure 7:
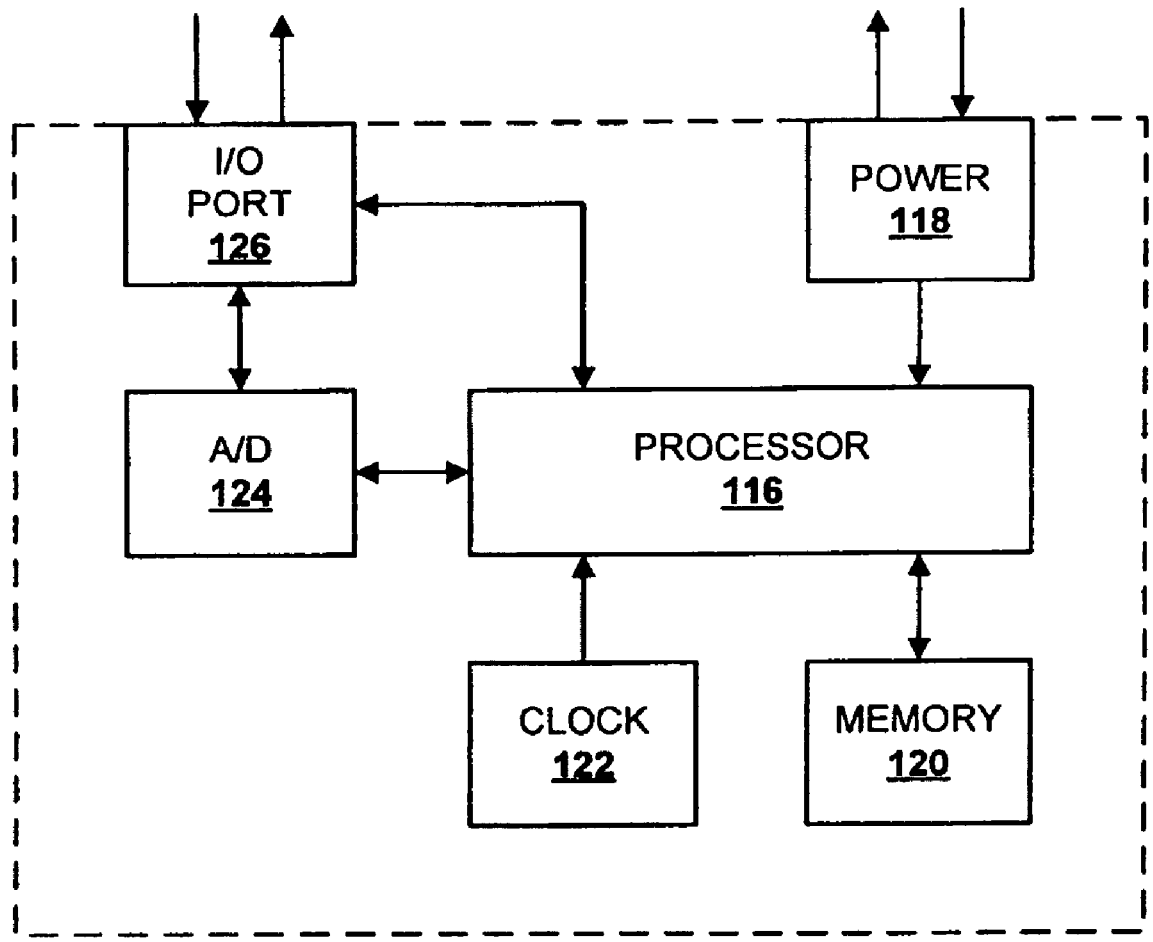
FIG. 7 is a system architecture for a controller suitable for use in the system according to FIG. 1.

FIG. 7 is a system architecture for the controller 92 suitable for use in the system 90. As shown in FIG. 7, the controller 92 includes a processor 116. This processor 116 is operably connected to a power supply 118, memory 120, clock 122, analog to digital converter (A/D) 124, and an input/output (I/O) port 126. The I/O port 126 is configured to receive signals from any suitably attached electronic device and forward these signals to the A/D 124 and/or the processor 116. If the signals are in analog format, the signals may proceed via the A/D 124. In this regard, the A/D 124 is configured to receive analog format signals and convert these signals into corresponding digital format signals. Conversely, the A/D 124 is configured to receive digital format signals from the processor 116, convert these signals to analog format, and forward the analog signals to the I/O port 126. In this manner, electronic devices configured to receive analog signals may intercommunicate with the processor 116.

The processor 116 is configured to receive and transmit signals to and from the A/D 124 and/or the I/O port 126. The processor 116 is further configured to receive time signals from the clock 122. In addition, the processor 116 is configured to store and retrieve electronic data to and from the memory 120. Furthermore, the processor 116 is configured to determine signals operable to modulate the positioning device controller 106 and thereby control the various actuators and/or servo motors of the AFLM 10 to exert a particular force and/or rotate to a particular degree. For example, signals associated with rotating the actuator 78 in a clockwise direction may be forwarded to the actuator 78 by the processor 116 via the I/O port 126 and thereby control the prepreg 18 to advance.

According to an embodiment of the invention, the processor 116 is configured to execute the code 94. Based on this set of instructions and signals from the various components of the AFLM 10, the processor 116 is configured to: determine a set of movement instructions; modulate the heater 110, tackifier applicator 108, cutting assemblies 32, and the like.

Figure 8:
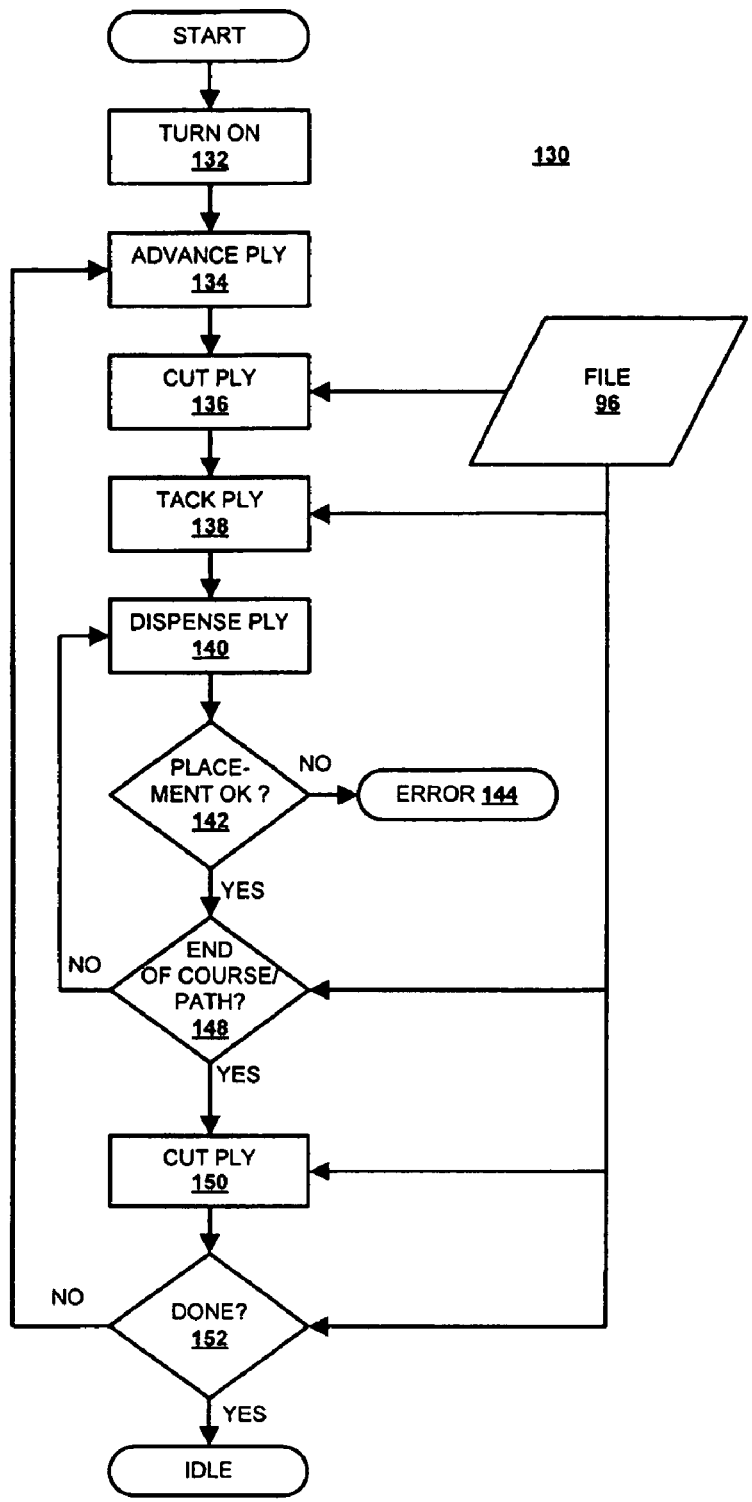
FIG. 8 is a flow diagram for a method of fabricating a composite item according to an embodiment of the invention.

FIG. 8 illustrates steps involved in a method 130 of placing plies to produce a composite structure or product. Prior to the initiation of the method 130, a composite product is designed and, based on this design, a series of computer readable instructions specifying attributes of the composite product is generated. These instructions are utilized to control the operations of the AFLM 10. In addition, a form such as the tool 16 is designed and constructed based upon the design of the composite product. Furthermore, the supply roll 20 is installed in the end effector 14 and the prepreg 18 is threaded through the end effector 14 as shown and described herein.

At step 132, the method 130 is initiated by turning on the various components of the AFLM 10 described herein above and executing the computer readable instructions.

At step 134, the prepreg 18 is modulated by the action of the supply roll 20, backing take-up roll 24, vacuum cutting drum 26, and/or the take-up roll 38. For example, in response to the end of the prepreg 18 differing from the edge of the tool 16, the vacuum cutting drum 26 is controlled to rotate and thereby advance or retreat the prepreg 18 until the prepreg 18 is in position to be cut by the cutting assemblies 32. It is to be noted that in an embodiment, the prepreg 18 is essentially always cut along one or both edges (profiles) and that the step 134 is optionally performed to position the prepreg 18 for a leading edge cut. It is an advantage of this embodiment that a substantially continuous band of edge material is maintained throughout the layup procedure to aid in handling the prepreg 18.

At step 136, instructions from the file 96 are utilized for cutting an appropriate leading edge and/or profile for the prepreg 18 at the start of a course. In response to the instructions, the cutting assemblies 32 cut the leading edge and/or profile. In addition, profile and diagonal cuts are performed in conjunction with rotation of the vacuum cutting drum 26. In this regard, cutting operations and feeding/movement operations are generally performed concurrently. Following the cuts, the prepreg 18 is advanced to a position at which the prepreg 18 is removed from the vacuum cutting drum 26 by the pressure shoe module 36. That is, when the leading edge is cut, its position upon the vacuum cutting drum 26 is known. The vacuum cutting drum 26 is advanced until the position of the leading edge is located appropriately relative to the pressure shoe module 36. As the prepreg 18 is further advanced and the pressure shoe module 36 is controlled to move in the lay down position, the prepreg 18 is preferentially drawn from the vacuum cutting drum 26 and remains attached to the contact surface 44 via the action of the vacuum from the vacuum ports 48. In addition, while the prepreg 18 is being advanced, edge profile cuts based on the file 96 are performed on the prepreg 18 by the cutting assemblies 32.

If tackifier is to be applied to the tool 16, the tackifier applicator 108 is controlled to do so and the heater 110 is optionally controlled to flash off at least a portion of a solvent in the tackifier. As described herein, the tackifier is applied in a controlled manner according to instructions in the file 96. In this manner, there is essentially no excess tackifier applied that might otherwise negatively impact the performance of the pressure shoe module 36.

At step 138, the prepreg 18 is "tacked" to a substrate. The substrate includes, at least, the tool 16 and/or a previously applied course of the prepreg 18. For example, the pressure shoe module 36 is controlled to move into the lay down position and further positioned relative to the tool 16 via the action of the positioning device 12. A downward force is applied to the pressure shoe module 36, pressing the prepreg 18 down upon the tool 16 with sufficient force to cause adhesion. In addition, the location on the tool 16 is determined based upon the series of computer readable instruction and/or the location of a previously positioned prepreg 18.

At step 140, the prepreg 18 is dispensed along a path across the tool 16. In order to minimize deformations in the prepreg 18 (e.g., wrinkles), this path is typically calculated to coincide with a "natural path" based upon any contours in the tool 16. As the end effector 14 is controlled along the path across the tool 16, the prepreg 18 is advanced via the action of the supply roll 20, backing take-up roll 24, vacuum cutting drum 26, and take-up roll 38 and edge profiles of the prepreg 18 are cut via the action of the cutting assemblies 32. As the prepreg 18 is being dispensed or applied to the tool 16, the curved leading edge of the contact surface 44 urges the prepreg 18 outward from approximately a longitudinal center line of the prepreg 18. It is an advantage of an embodiment that this outward urging "forms," trellises, or alters the angle between the warp and the weft of the prepreg 18 over contours in the tool 16 and thereby reduces wrinkles or bridges in the prepreg 18.

At step 142, the placement of the prepreg 18 on the tool 16 is evaluated. For example, an operator or a sensor may sense the relative position of the prepreg 18 and a previously positioned prepreg 18 and determine if the distance between these plies is within a predetermined tolerance. If the distance between these plies is not within the predetermined tolerance, an error may be generated at step 144. If the distance between these plies is within the predetermined tolerance, it is determined if the end of the path has been reached at step 148. In addition to placement of the prepreg 18, wrinkles, bridges, foreign objects, debris, and the like are optionally sensed for by an operator and/or sensor. If any such abnormalcy is sensed, an error is generated.

At step 148, it is determined if the end of the course has been reached. More specifically, it is determined if the prepreg 18 that is approaching the cutting assemblies 32 is to be end cut. If, based on the series of computer readable instruction, it is determined the prepreg 18 has not advanced to the end of the course, additional prepreg 18 is dispensed at step 140. If, it is determined the prepreg 18 has advanced to the end of the course, the prepreg 18 is end cut at step 150.

At step 150, the end of the prepreg 18 is cut based upon the series of computer readable instruction contained in the file 96, the orientation of a previously positioned prepreg 18, and/or the location of a previously positioned prepreg 18. In addition, to reduce the likelihood that the prepreg 18 adheres to the contact surface 44, the pressure shoe module 36 is controlled to maintain a forward movement with respect to the tool 16 as the end of the prepreg 18 is applied to the tool 16. That is, rather than coming to a stop at the end of the path, the positioning device 12 controls the end effector 14 to advance past the end of the path and the pressure shoe module 36 is optionally controlled to lift off the surface of the tool 16 as it is advanced past the end of the prepreg 18.

In an embodiment, to perform the trailing edge cut and maintain forward movement of the end effector 14, the end effector 14 is controlled to advance a sufficient excess of the prepreg 18 to complete the cut without stoppage of the end effector 14. For trailing edge cuts other than 90° "butt cuts", little or no excess prepreg 18 may be required as the cutting assembly 32 may be sufficiently fast to perform the cut while the prepreg 18 is in motion. Cuts at about 90° are generally performed while the vacuum cutting drum 26 is essentially stationary. However, by generating excess prepreg 18 between the vacuum cutting drum 26 and the pressure shoe module 36, the vacuum cutting drum 26 may be held in a stationary manner until the cut is completed while the end effector 14 maintains forward progress. In this regard, some amount of slack or buffer of the prepreg 18 is generally maintained between the vacuum cutting drum 26 and the pressure shoe module 36 as a normal course to reduce tension and thereby facilitate trellising of the prepreg 18. In addition, to further facilitate cutting operations described herein, a third cutting assembly 32 may be included in the end effector 14.

At step 152, it is determined if the placement of prepreg 18 on the composite product has been completed. For example, if all of the computer readable instructions in the file 96 have been completed, it may be determined that the placement of plies for the composite product has been completed and the AFLM 10 may idle until another series of computer readable instructions is initiated. If is determined the placement of prepreg 18 for the composite product is not completed, an additional prepreg 18 placement may proceed at step 134.

Following the method 130, the composite product may be cured in any suitable manner. In the aerospace industry, thermoset resins are generally utilized to pre-impregnate ply material. These thermoset resins are typically cured by being held at an elevated temperature for a predetermined amount of time. Times and temperatures may be selected depending on the resin used, the size and thickness of the composite product, and the like. An advantage of at least some embodiments of the invention is that the spreading and smoothing capabilities of the contact surface 44 allows for the use of relatively wider prepreg 18. In particular, the use of wider prepreg 18 while generating contoured composite products is enhanced. In known ply placement systems, wider ply stock tends to wrinkle when applied to contours.

Although an example of the end effector 14 is shown being controlled by the positioning device 12, it will be appreciated that other control systems can be used. In this regard, a gantry system or other such known positioning devices that support and control the movement of any suitable end effector are suitable for use with end effector 14 which incorporates the pressure shoe module 36. Also, although the AFLM 10 is useful to place plies for composite products in the airline industry it can also be used in other industries that construct composite product. These industries include, but are not limited to, automobile, marine, spacecraft, building, and consumer products.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device to apply a resin impregnated fabric to a substrate, the device comprising:
   a cutting assembly to cut the fabric, the cutting assembly comprising:

a vacuum cutting drum to support the fabric during cutting of the fabric, the vacuum cutting drum comprising:
a porous cylinder;
a vacuum chamber to draw air through the porous cylinder;
a fitting to connect the vacuum chamber to a vacuum source; and
a seal to generate a substantially gas impermeable interface between the fitting and the porous cylinder;
a surface to move relative to the substrate and to conform to the substrate, the surface comprising:
a layer of material compatible for use with the resin;
a first edge disposed at a front portion of the surface relative to movement of the device to the fabric, the first edge being curved with a center portion of the first edge being relatively forward of a pair of side portions of the first edge;
a second edge disposed to a rear of the surface relative to the movement of the device to the fabric; and
a vacuum port disposed between the first edge and the second edge, the vacuum port having a vacuum force to remove the fabric from the vacuum cutting drum.

2. The device according to claim 1, wherein the cutting assembly is configured to perform end cuts and profile cuts.

3. A device to apply a resin impregnated fabric to a substrate, the device comprising:
a supply reel to supply the fabric;
a cutting system to cut fabric, the cutting system comprising:
a cutting assembly to cut a leading edge, a trailing edge, and a profile of the fabric; and
a vacuum cutting drum to support the fabric during cutting of the fabric, the vacuum cutting drum comprising:
a porous cylinder;
a vacuum chamber to draw air through the porous cylinder;
a fitting to connect the vacuum chamber to a vacuum source; and
a seal to generate a substantially gas impermeable interface between the fitting and the porous cylinder; and
a pressure shoe module to press the fabric on to the substrate, the pressure shoe module comprising:
a surface to move relative to the substrate and to conform to the substrate, the surface comprising:
a layer of material compatible for use with the resin; and
a first edge disposed at a front portion of the surface relative to movement of the pressure shoe module to the fabric, the first edge being curved with a center portion of the first edge being relatively forward of a pair of side portions of the first edge;
a second edge disposed to a rear of the surface relative to the movement of the device to the fabric; and
a vacuum port disposed between the first edge and the second edge, the vacuum port having a vacuum force to remove the fabric from the vacuum cutting drum.

4. The device according to claim 3, wherein the pressure shoe module further comprises:
a linkage to facilitate movement of the pressure shoe module from a transfer position to a lay down position, the transfer position facilitating removing the fabric from the cutting system, the lay down position facilitating application of the fabric to the substrate; and
an actuator to apply torque to the linkage, wherein the applied torque urges the pressure shoe module to move.

5. A system for fabricating a composite item from a resin impregnated fabric placed on a layup form, the system comprising:
a vacuum source to generate a vacuum;
a vacuum cutting drum to support the fabric during cutting of the fabric, the vacuum cutting drum comprising:
a porous cylinder;
a vacuum chamber to draw air through the porous cylinder;
a fitting to connect the vacuum chamber to the vacuum source; and
a seal to generate a substantially gas impermeable interface between the fitting and the porous cylinder;
an end effector along a natural path across the layup form, the end effector comprising:
a supply reel to retain a supply of the fabric, wherein the fabric is withdrawn from the supply reel at a feed rate; and
a pressure shoe module to press the fabric on to the layup form, the pressure shoe module comprising:
a surface to move relative to the layup form and to conform to the layup form, the surface comprising:
a layer of material compatible for use with the resin; and
a first edge disposed at a front portion of the surface relative to movement of the pressure shoe module to the fabric, the first edge being curved with a center portion of the first edge being relatively forward of a pair of side portions of the first edge;
a second edge disposed to a rear of the surface relative to the movement of the system to the fabric; and
a vacuum port disposed between the first edge and the second edge, the vacuum port being connected to the vacuum source and having a vacuum force to remove the fabric from the vacuum cutting drum; and
a positioning device to move the end effector.

6. The system according to claim 5, further comprising:
a cutting assembly to cut the fabric.

7. The system according to claim 5 further comprising:
a take-up roll to accumulate excess fabric cut from the fabric during a profile cut of the fabric, wherein a band of excess fabric is generated to facilitate handling of the fabric.

* * * * *